(12) United States Patent
Sakurai et al.

(10) Patent No.: US 8,027,862 B2
(45) Date of Patent: Sep. 27, 2011

(54) TIME SERIES PATTERN GENERATING SYSTEM AND METHOD USING HISTORICAL INFORMATION

(75) Inventors: Takao Sakurai, Kokubunji (JP); Ken Naono, Tokyo (JP); Masashi Egi, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 744 days.

(21) Appl. No.: 11/806,819

(22) Filed: Jun. 4, 2007

(65) Prior Publication Data

US 2007/0288443 A1     Dec. 13, 2007

(30) Foreign Application Priority Data

Jun. 9, 2006  (JP) ................ 2006-161200

(51) Int. Cl.
  *G06F 17/30*  (2006.01)
(52) U.S. Cl. .................................. 705/7.27
(58) Field of Classification Search ........... 705/7; 707/3
  See application file for complete search history.

(56) References Cited

U.S. PATENT DOCUMENTS

| | | | | |
|---|---|---|---|---|
| 4,954,981 | A * | 9/1990 | Dehner et al. ............... | 345/440 |
| 6,278,977 | B1 * | 8/2001 | Agrawal et al. ............. | 705/7 |
| 2001/0013008 | A1 * | 8/2001 | Waclawski .................. | 705/10 |
| 2002/0174093 | A1 * | 11/2002 | Casati et al. ................ | 707/1 |
| 2005/0125249 | A1 * | 6/2005 | Takubo et al. .............. | 705/1 |
| 2005/0283680 | A1 | 12/2005 | Kobayashi et al. | |

FOREIGN PATENT DOCUMENTS

| | | |
|---|---|---|
| JP | 2002-107473 | 6/2001 |
| JP | 2005-62963 | 8/2003 |
| JP | 2006-004346 | 6/2004 |

OTHER PUBLICATIONS

Saraiya, Puvi et al.; Visualization of graph wit associated timeseries data; Oct. 23-25, 2005; IEEE Xplore; Information Visualization, 2005; pp. 225-232.*
Anklesaria, Kaiomars P.; Estimated the Future State of a System Through Time-Series Nominal Data Analysis; Dec. 1986; Palgrave Macmillan Journals; The Journal of the Operational Research Society, vol. 37, No. 12; pp. 1105-1112.*
Agrawal, Rakesh et al.; Mining process models from workflow logs; 1998; Springer Berlin/Heidelberg; vol. 1377/1998; pp. 1-14.*

(Continued)

*Primary Examiner* — Susanna M Meinecke Diaz
*Assistant Examiner* — Ashley Chou
(74) *Attorney, Agent, or Firm* — Stites & Harbison PLLC; Juan Carlos A. Marquez, Esq.

(57) ABSTRACT

An object of this invention is to analyze history information for each of a plurality of instances, and generate a time series pattern for each of a plurality of business processes. A time series pattern generating system analyzes the history information of an instance generated upon each execution of a class that defines a series of processes and is constituted by components having a defined order, and generates a time series pattern. The history information is generated upon each execution of the components, stored in chronological order, and includes a class identifier, a component identifier, an instance identifier, and component processing time information. Information relating to the processing order of the components that are executed in each instance is created, dependence relationships between the components are estimated, and a time series pattern including a component processing order is generated.

11 Claims, 20 Drawing Sheets

OTHER PUBLICATIONS

Weijters A.J.M.M et al.; Rediscovering Workflow Models from Event-Based Data using Little Thumb; 2003; IOS Press; vol. 10, No. 2/2003; pp. 151-162.*

Li B. et al.; Matrix-Based Component Dependence Representation and Its Application in Software Quality Assurance; 2005; ACM; ACM SIGPLAN Notices, vol. 40, Issue 11, Nov. 2005; pp. 29-36.*

* cited by examiner

| START TIME | END TIME | BUSINESS PROCESS | INSTANCE IDENTIFI-CATION INFORMA-TION | OPERATION NAME | OPERATOR ID |
|---|---|---|---|---|---|
| 10:10'30"401 | 10:10'30"450 | PAYMENT SLIP PROCESSING | 1 | A : PRODUCT INPUT | 100001 |
| 10:10'30"809 | 10:10'30"917 | PAYMENT SLIP PROCESSING | 1 | B : AMOUNT INPUT | 100001 |
| 10:10'31"203 | 10:10'31"300 | PAYMENT SLIP PROCESSING | 1 | C : DESTINATION INPUT | 100001 |
| 10:10'33"401 | 10:10'33"480 | PAYMENT SLIP PROCESSING | 1 | D : APPROVAL | 100001 |
| 10:10'34"317 | 10:10'34"772 | PAYMENT SLIP PROCESSING | 1 | E : ACCOUNTING APPROVAL | 100001 |
| 10:10'35"772 | 10:10'35"891 | PAYMENT SLIP PROCESSING | 1 | F : FACTORY APPROVAL | 100001 |
| 10:10'36"112 | 10:10'39"512 | ORDER PLACEMENT | 2 | A : PRODUCT INPUT | 100003 |
| 10:10'50"677 | 10:10'55"192 | ORDER PLACEMENT | 2 | C : DESTINATION INPUT | 100003 |
| 10:11'30"401 | 10:11'30"121 | ORDER PLACEMENT | 2 | D : APPROVAL | 100003 |
| 10:11'30"401 | 10:11'30"450 | ORDER PLACEMENT | 2 | F : FACTORY APPROVAL | 100003 |
| 10:11'30"809 | 10:11'30"917 | PAYMENT SLIP PROCESSING | 3 | A : PRODUCT INPUT | 100002 |
| 10:11'31"203 | 10:11'31"300 | ORDER PLACEMENT | 2 | G : CONSTITUTION INSTRUCTION | 100003 |
| 10:11'33"401 | 10:11'33"480 | ORDER PLACEMENT | 2 | H : SE INSTRUCTION | 100003 |
| 10:11'34"317 | 10:11'34"772 | PAYMENT SLIP PROCESSING | 3 | C : DESTINATION INPUT | 100002 |
| 10:11'35"772 | 10:11'35"891 | PAYMENT SLIP PROCESSING | 4 | C : DESTINATION INPUT | 100001 |
| 10:11'36"112 | 10:11'39"512 | PAYMENT SLIP PROCESSING | 4 | A : PRODUCT INPUT | 100001 |
| 10:11'50"677 | 10:11'55"192 | PAYMENT SLIP PROCESSING | 4 | B : AMOUNT INPUT | 100001 |
| 10:12'30"401 | 10:12'30"121 | PAYMENT SLIP PROCESSING | 3 | B : AMOUNT INPUT | 100002 |
| 10:12'30"401 | 10:12'30"450 | PAYMENT SLIP PROCESSING | 3 | D : APPROVAL | 100002 |
| 10:12'30"809 | 10:12'30"917 | PAYMENT SLIP PROCESSING | 4 | D : AUTHORIZATION | 100001 |
| 10:12'31"203 | 10:12'31"300 | PAYMENT SLIP PROCESSING | 4 | E : ACCOUNTING APPROVAL | 100001 |
| 10:12'33"401 | 10:12'33"480 | PAYMENT SLIP PROCESSING | 4 | F : FACTORY APPROVAL | 100001 |
| 10:12'34"317 | 10:12'34"772 | PAYMENT SLIP PROCESSING | 3 | F : FACTORY APPROVAL | 100002 |
| 10:12'35"772 | 10:12'35"891 | PAYMENT SLIP PROCESSING | 3 | E : ACCOUNTING APPROVAL | 100002 |

*FIG. 4*

| START TIME | END TIME | BUSINESS PROCESS | INSTANCE IDENTIFICATION INFORMATION | OPERATION NAME | OPERATOR ID | |
|---|---|---|---|---|---|---|
| 10:10'30"401 | 10:10'30"450 | PAYMENT SLIP PROCESSING | 1 | A : PRODUCT INPUT | 100001 | → A |
| 10:10'30"809 | 10:10'30"917 | PAYMENT SLIP PROCESSING | 1 | B : AMOUNT INPUT | 100001 | → B |
| 10:10'31"203 | 10:10'31"300 | PAYMENT SLIP PROCESSING | 1 | C : DESTINATION INPUT | 100001 | → C |
| 10:10'33"401 | 10:10'33"480 | PAYMENT SLIP PROCESSING | 1 | D : APPROVAL | 100001 | → D |
| 10:10'34"317 | 10:10'34"772 | PAYMENT SLIP PROCESSING | 1 | E : ACCOUNTING APPROVAL | 100001 | → E |
| 10:10'35"772 | 10:10'35"891 | PAYMENT SLIP PROCESSING | 1 | F : FACTORY APPROVAL | 100001 | → F |
| 10:10'36"112 | 10:10'39"512 | ORDER PLACEMENT | 2 | A : PRODUCT INPUT | 100003 | |
| 10:10'50"677 | 10:10'55"192 | ORDER PLACEMENT | 2 | C : DESTINATION INPUT | 100003 | |
| 10:11'30"401 | 10:11'30"121 | ORDER PLACEMENT | 2 | D : SUPERIOR'S APPROVAL | 100003 | |
| 10:11'30"401 | 10:11'30"450 | ORDER PLACEMENT | 2 | F : FACTORY APPROVAL | 100003 | |
| 10:11'30"809 | 10:11'30"917 | PAYMENT SLIP PROCESSING | 3 | A : PRODUCT INPUT | 100002 | → G |
| 10:11'31"203 | 10:11'31"300 | ORDER PLACEMENT | 2 | G : CONSTITUTION INSTRUCTION | 100003 | |
| 10:11'33"401 | 10:11'33"480 | ORDER PLACEMENT | 2 | H : SE INSTRUCTION | 100003 | |
| 10:11'34"317 | 10:11'34"772 | PAYMENT SLIP PROCESSING | 3 | C : DESTINATION INPUT | 100002 | → I |
| 10:11'35"772 | 10:11'35"891 | PAYMENT SLIP PROCESSING | 4 | C : DESTINATION INPUT | 100001 | → H |
| 10:11'36"112 | 10:11'39"512 | PAYMENT SLIP PROCESSING | 4 | A : PRODUCT INPUT | 100001 | → J |
| 10:11'50"677 | 10:11'55"192 | PAYMENT SLIP PROCESSING | 4 | B : AMOUNT INPUT | 100001 | → K |
| 10:12'30"401 | 10:12'30"121 | PAYMENT SLIP PROCESSING | 3 | B : AMOUNT INPUT | 100002 | → L |
| 10:12'30"401 | 10:12'30"450 | PAYMENT SLIP PROCESSING | 3 | D : SUPERIOR'S APPROVAL | 100002 | → M |
| 10:12'30"809 | 10:12'30"917 | PAYMENT SLIP PROCESSING | 4 | D : SUPERIOR'S APPROVAL | 100001 | → N |
| 10:12'31"203 | 10:12'31"300 | PAYMENT SLIP PROCESSING | 4 | E : ACCOUNTING APPROVAL | 100001 | → O |
| 10:12'33"401 | 10:12'33"480 | PAYMENT SLIP PROCESSING | 4 | F : FACTORY APPROVAL | 100001 | → P |
| 10:12'34"317 | 10:12'34"772 | PAYMENT SLIP PROCESSING | 3 | F : FACTORY APPROVAL | 100002 | → Q |
| 10:12'35"772 | 10:12'35"891 | PAYMENT SLIP PROCESSING | 3 | E : ACCOUNTING APPROVAL | 100002 | → R |

*FIG. 6A*

402 

| | START TIME | END TIME | BUSINESS PROCESS | INSTANCE IDENTIFICATION INFORMATION | OPERATION NAME | OPERATOR ID |
|---|---|---|---|---|---|---|
| A → | 10:10'30"401 | 10:10'30"450 | PAYMENT SLIP PROCESSING | 1 | A : PRODUCT INPUT | 100001 |
| B → | 10:10'30"809 | 10:10'30"917 | PAYMENT SLIP PROCESSING | 1 | B : AMOUNT INPUT | 100001 |
| C → | 10:10'31"203 | 10:10'31"300 | PAYMENT SLIP PROCESSING | 1 | C : DESTINATION INPUT | 100001 |
| D → | 10:10'33"401 | 10:10'33"480 | PAYMENT SLIP PROCESSING | 1 | D : APPROVAL | 100001 |
| E → | 10:10'34"317 | 10:10'34"772 | PAYMENT SLIP PROCESSING | 1 | E : ACCOUNTING APPROVAL | 100001 |
| F → | 10:10'35"772 | 10:10'35"891 | PAYMENT SLIP PROCESSING | 1 | F : FACTORY APPROVAL | 100001 |
| G → | 10:11'30"809 | 10:11'30"917 | PAYMENT SLIP PROCESSING | 3 | A : PRODUCT INPUT | 100002 |
| H → | 10:11'34"317 | 10:11'34"772 | PAYMENT SLIP PROCESSING | 3 | C : DESTINATION INPUT | 100002 |
| I → | 10:11'35"772 | 10:11'35"891 | PAYMENT SLIP PROCESSING | 4 | C : DESTINATION INPUT | 100001 |
| J → | 10:11'36"112 | 10:11'39"512 | PAYMENT SLIP PROCESSING | 4 | A : PRODUCT INPUT | 100001 |
| K → | 10:11'50"677 | 10:11'55"192 | PAYMENT SLIP PROCESSING | 4 | B : AMOUNT INPUT | 100001 |
| L → | 10:12'30"401 | 10:12'30"121 | PAYMENT SLIP PROCESSING | 3 | B : AMOUNT INPUT | 100002 |
| M → | 10:12'30"401 | 10:12'30"450 | PAYMENT SLIP PROCESSING | 3 | D : APPROVAL | 100002 |
| N → | 10:12'30"809 | 10:12'30"917 | PAYMENT SLIP PROCESSING | 4 | D : APPROVAL | 100001 |
| O → | 10:12'31"203 | 10:12'31"300 | PAYMENT SLIP PROCESSING | 4 | E : ACCOUNTING APPROVAL | 100001 |
| P → | 10:12'33"401 | 10:12'33"480 | PAYMENT SLIP PROCESSING | 4 | F : FACTORY APPROVAL | 100001 |
| Q → | 10:12'34"317 | 10:12'34"772 | PAYMENT SLIP PROCESSING | 3 | F : FACTORY APPROVAL | 100002 |
| R → | 10:12'35"772 | 10:12'35"891 | PAYMENT SLIP PROCESSING | 3 | E : ACCOUNTING APPROVAL | 100002 |

| START TIME | END TIME | BUSINESS PROCESS | INSTANCE IDENTIFICATION INFORMATION | OPERATION NAME | OPERATOR ID | |
|---|---|---|---|---|---|---|
| 10:10'30"401 | 10:10'30"450 | PAYMENT SLIP PROCESSING | 1 | A : PRODUCT INPUT | 100001 | ► A |
| 10:10'30"809 | 10:10'30"917 | PAYMENT SLIP PROCESSING | 1 | B : AMOUNT INPUT | 100001 | ► B |
| 10:10'31"203 | 10:10'31"300 | PAYMENT SLIP PROCESSING | 1 | C : DESTINATION INPUT | 100001 | ► C |
| 10:10'33"401 | 10:10'33"480 | PAYMENT SLIP PROCESSING | 1 | D : APPROVAL | 100001 | ► D |
| 10:10'34"317 | 10:10'34"772 | PAYMENT SLIP PROCESSING | 1 | E : ACCOUNTING APPROVAL | 100001 | ► E |
| 10:10'35"772 | 10:10'35"891 | PAYMENT SLIP PROCESSING | 1 | F : FACTORY APPROVAL | 100001 | ► F |
| 10:11'30"809 | 10:11'30"917 | PAYMENT SLIP PROCESSING | 3 | A : PRODUCT INPUT | 100002 | ► G |
| 10:11'34"317 | 10:11'34"772 | PAYMENT SLIP PROCESSING | 3 | C : DESTINATION INPUT | 100002 | ► H |
| 10:11'35"772 | 10:11'35"891 | PAYMENT SLIP PROCESSING | 4 | C : DESTINATION INPUT | 100001 | ► I |
| 10:11'36"112 | 10:11'39"512 | PAYMENT SLIP PROCESSING | 4 | A : PRODUCT INPUT | 100001 | ► J |
| 10:11'50"677 | 10:11'55"192 | PAYMENT SLIP PROCESSING | 4 | B : AMOUNT INPUT | 100001 | ► L |
| 10:12'30"401 | 10:12'30"121 | PAYMENT SLIP PROCESSING | 3 | B : AMOUNT INPUT | 100002 | ► K |
| 10:12'30"401 | 10:12'30"450 | PAYMENT SLIP PROCESSING | 3 | D : APPROVAL | 100002 | ► M |
| 10:12'30"809 | 10:12'30"917 | PAYMENT SLIP PROCESSING | 4 | D : APPROVAL | 100001 | ► N |
| 10:12'31"203 | 10:12'31"300 | PAYMENT SLIP PROCESSING | 4 | E : ACCOUNTING APPROVAL | 100001 | ► O |
| 10:12'33"401 | 10:12'33"480 | PAYMENT SLIP PROCESSING | 4 | F : FACTORY APPROVAL | 100001 | ► P |
| 10:12'34"317 | 10:12'34"772 | PAYMENT SLIP PROCESSING | 3 | F : FACTORY APPROVAL | 100002 | ► Q |
| 10:12'35"772 | 10:12'35"891 | PAYMENT SLIP PROCESSING | 3 | E : ACCOUNTING APPROVAL | 100002 | ► R |

| | START TIME | END TIME | BUSINESS PROCESS | INSTANCE IDENTIFICATION INFORMATION | OPERATION NAME | OPERATOR ID |
|---|---|---|---|---|---|---|
| A → | 10:10'30"401 | 10:10'30"450 | PAYMENT SLIP PROCESSING | 1 | A : PRODUCT INPUT | 100001 |
| B → | 10:10'30"809 | 10:10'30"917 | PAYMENT SLIP PROCESSING | 1 | B : AMOUNT INPUT | 100001 |
| C → | 10:10'31"203 | 10:10'31"300 | PAYMENT SLIP PROCESSING | 1 | C : DESTINATION INPUT | 100001 |
| D → | 10:10'33"401 | 10:10'33"480 | PAYMENT SLIP PROCESSING | 1 | D : APPROVAL | 100001 |
| E → | 10:10'34"317 | 10:10'34"772 | PAYMENT SLIP PROCESSING | 1 | E : ACCOUNTING APPROVAL | 100001 |
| F → | 10:10'35"772 | 10:10'35"891 | PAYMENT SLIP PROCESSING | 1 | F : FACTORY APPROVAL | 100001 |

| | START TIME | END TIME | BUSINESS PROCESS | INSTANCE IDENTIFICATION INFORMATION | OPERATION NAME | OPERATOR ID |
|---|---|---|---|---|---|---|
| G → | 10:11'30"809 | 10:11'30"917 | PAYMENT SLIP PROCESSING | 3 | A : PRODUCT INPUT | 100002 |
| H → | 10:11'34"317 | 10:11'34"772 | PAYMENT SLIP PROCESSING | 3 | C : DESTINATION INPUT | 100002 |
| I → | 10:12'30"401 | 10:12'30"121 | PAYMENT SLIP PROCESSING | 3 | B : AMOUNT INPUT | 100002 |
| J → | 10:12'30"401 | 10:12'30"450 | PAYMENT SLIP PROCESSING | 3 | D : APPROVAL | 100002 |
| L → | 10:12'34"317 | 10:12'34"772 | PAYMENT SLIP PROCESSING | 3 | F : FACTORY APPROVAL | 100002 |
| K → | 10:12'35"772 | 10:12'35"891 | PAYMENT SLIP PROCESSING | 3 | E : ACCOUNTING APPROVAL | 100002 |

*FIG. 7C*

| | START TIME | END TIME | BUSINESS PROCESS | INSTANCE IDENTIFI-CATION INFORMA-TION | OPERATION NAME | OPERATOR ID |
|---|---|---|---|---|---|---|
| M → | 10:11'35"772 | 10:11'35"891 | PAYMENT SLIP PROCESSING | 4 | C : DESTINATION INPUT | 100001 |
| N → | 10:11'36"112 | 10:11'39"512 | PAYMENT SLIP PROCESSING | 4 | A : PRODUCT INPUT | 100001 |
| O → | 10:11'50"677 | 10:11'55"192 | PAYMENT SLIP PROCESSING | 4 | B : AMOUNT INPUT | 100001 |
| P → | 10:12'30"809 | 10:12'30"917 | PAYMENT SLIP PROCESSING | 4 | D : APPROVAL | 100001 |
| Q → | 10:12'31"203 | 10:12'31"300 | PAYMENT SLIP PROCESSING | 4 | E : ACCOUNTING APPROVAL | 100001 |
| R → | 10:12'33"401 | 10:12'33"480 | PAYMENT SLIP PROCESSING | 4 | F : FACTORY APPROVAL | 100001 |

*FIG. 7D*

| MATRIX X1 | | | | | | |
|---|---|---|---|---|---|---|
|   | A | B | C | D | E | F |
| A | 0 | 1 | 1 | 1 | 1 | 1 |
| B | 0 | 0 | 1 | 1 | 1 | 1 |
| C | 0 | 0 | 0 | 1 | 1 | 1 |
| D | 0 | 0 | 0 | 0 | 1 | 1 |
| E | 0 | 0 | 0 | 0 | 0 | 1 |
| F | 0 | 0 | 0 | 0 | 0 | 0 |

601

| MATRIX X2 | | | | | | |
|---|---|---|---|---|---|---|
|   | A | B | C | D | E | F |
| A | 0 | 1 | 1 | 1 | 1 | 1 |
| B | 0 | 0 | 0 | 1 | 1 | 1 |
| C | 0 | 1 | 0 | 1 | 1 | 1 |
| D | 0 | 0 | 0 | 0 | 1 | 1 |
| E | 0 | 0 | 0 | 0 | 0 | 0 |
| F | 0 | 0 | 0 | 0 | 1 | 0 |

602

| MATRIX X3 | | | | | | |
|---|---|---|---|---|---|---|
|   | A | B | C | D | E | F |
| A | 0 | 1 | 0 | 1 | 1 | 1 |
| B | 0 | 0 | 0 | 1 | 1 | 1 |
| C | 1 | 1 | 0 | 1 | 1 | 1 |
| D | 0 | 0 | 0 | 0 | 1 | 1 |
| E | 0 | 0 | 0 | 0 | 0 | 1 |
| F | 0 | 0 | 0 | 0 | 0 | 0 |

MATRIX X1 (601)

|   | A | B | C | D | E | F |
|---|---|---|---|---|---|---|
| A | 0 | 1 | 1 | 1 | 1 | 1 |
| B | 0 | 0 | 1 | 1 | 1 | 1 |
| C | 0 | 0 | 0 | 1 | 1 | 1 |
| D | 0 | 0 | 0 | 0 | 1 | 1 |
| E | 0 | 0 | 0 | 0 | 0 | 1 |
| F | 0 | 0 | 0 | 0 | 0 | 0 |

×

MATRIX X2 (602)

|   | A | B | C | D | E | F |
|---|---|---|---|---|---|---|
| A | 0 | 1 | 1 | 1 | 1 | 1 |
| B | 0 | 0 | 0 | 1 | 1 | 1 |
| C | 0 | 1 | 0 | 1 | 1 | 1 |
| D | 0 | 0 | 0 | 0 | 1 | 1 |
| E | 0 | 0 | 0 | 0 | 0 | 0 |
| F | 0 | 0 | 0 | 0 | 1 | 0 |

=

MATRIX X4 (702)

|   | A | B | C | D | E | F |
|---|---|---|---|---|---|---|
| A | 0 | 1 | 1 | 1 | 1 | 1 |
| B | 0 | 0 | 0 | 1 | 1 | 1 |
| C | 0 | 0 | 0 | 1 | 1 | 1 |
| D | 0 | 0 | 0 | 0 | 1 | 1 |
| E | 0 | 0 | 0 | 0 | 0 | 0 |
| F | 0 | 0 | 0 | 0 | 0 | 0 |

MATRIX X4 (702)

|   | A | B | C | D | E | F |
|---|---|---|---|---|---|---|
| A | 0 | 1 | 1 | 1 | 1 | 1 |
| B | 0 | 0 | 0 | 1 | 1 | 1 |
| C | 0 | 0 | 0 | 1 | 1 | 1 |
| D | 0 | 0 | 0 | 0 | 1 | 1 |
| E | 0 | 0 | 0 | 0 | 0 | 0 |
| F | 0 | 0 | 0 | 0 | 0 | 0 |

×

MATRIX X3 (603)

|   | A | B | C | D | E | F |
|---|---|---|---|---|---|---|
| A | 0 | 1 | 0 | 1 | 1 | 1 |
| B | 0 | 0 | 0 | 1 | 1 | 1 |
| C | 1 | 1 | 0 | 1 | 1 | 1 |
| D | 0 | 0 | 0 | 0 | 1 | 1 |
| E | 0 | 0 | 0 | 0 | 0 | 1 |
| F | 0 | 0 | 0 | 0 | 0 | 0 |

=

MATRIX X5 (703)

|   | A | B | C | D | E | F |
|---|---|---|---|---|---|---|
| A | 0 | 1 | 0 | 1 | 1 | 1 |
| B | 0 | 0 | 0 | 1 | 1 | 1 |
| C | 0 | 0 | 0 | 1 | 1 | 1 |
| D | 0 | 0 | 0 | 0 | 1 | 1 |
| E | 0 | 0 | 0 | 0 | 0 | 0 |
| F | 0 | 0 | 0 | 0 | 0 | 0 |

| | MATRIX Y6 | | | | | | |
|---|---|---|---|---|---|---|---|
| | A | B | C | D | E | F | END |
| A | 0 | $\frac{2}{3}$ | $\frac{1}{3}$ | 0 | 0 | 0 | 0 |
| B | 0 | 0 | $\frac{1}{3}$ | $\frac{2}{3}$ | 0 | 0 | 0 |
| C | $\frac{1}{3}$ | $\frac{1}{3}$ | 0 | $\frac{1}{3}$ | 0 | 0 | 0 |
| D | 0 | 0 | 0 | 0 | $\frac{2}{3}$ | $\frac{1}{3}$ | 0 |
| E | 0 | 0 | 0 | 0 | 0 | $\frac{2}{3}$ | $\frac{1}{3}$ |
| F | 0 | 0 | 0 | 0 | $\frac{1}{3}$ | 0 | $\frac{2}{3}$ |
| START | $\frac{2}{3}$ | 0 | $\frac{1}{3}$ | 0 | 0 | 0 | |

FIG. 15B

TIME SERIES PATTERN GENERATING SYSTEM AND METHOD USING HISTORICAL INFORMATION

CLAIM OF PRIORITY

The present application claims priority from Japanese patent application JP 2006-161200 filed on Jun. 9, 2006, the content of which is hereby incorporated by reference into this application.

BACKGROUND OF THE INVENTION

This invention relates to a time series pattern generating system for generating a time series pattern relating to an operation processing order from an event log in which event records recorded with the processing history of a plurality of operations constituting a business process are arranged in chronological order.

In recent years, demand for improvements in business efficiency, security and so on has increased together with the need to obtain a detailed understanding of business process conditions. In response to these needs, BAM (business activity monitoring) has been proposed as a technique for understanding business process conditions from a server side using a workflow system. In BAM, business process conditions are learned by recording and analyzing an operation processing history in accordance with a workflow that defines a processing order of operations constituting a pre-registered business process and dependence relationships therebetween. In addition to the operations defined in the workflow, however, an actual business is executed in conjunction with spreadsheet or plotting applications and so on that cannot be monitored on the server side, and therefore, with BAM alone, business process conditions cannot be understood accurately.

To solve this problem, a method of recording the processing history of the business at the business venue has been proposed. In a technique disclosed in JP 2002-107473 A, for example, a recording application is installed on a terminal used for the business by an operator. At the start time and end time of each operation of each business process, the operator operates the recording application to input a business process name, an operation name, job identification information, and start/end times, and records these items as an event record. An event log is then generated by arranging the recorded event records in chronological order. With the technique disclosed in JP 2002-107473 A, business process conditions can be recorded in this manner.

However, with the technique disclosed in JP2002-107473, only a method of recording an event log is disclosed, and therefore a technique for analyzing an event log including an extremely large number of recorded event records is required.

Hence, JP 2006-004346 A discloses a technique for determining an order relationship between two event records included in an extremely large event log from a start time and an occurrence probability, and extracting an occurrence pattern of the event record by combining the obtained relationships.

Further, JP 2005-062963 A discloses a technique for classifying event records hierarchically, and extracting and displaying a time series pattern, which indicates the frequent occurrence of relationships between event records on each tier of the hierarchy, from a start time and an occurrence probability.

SUMMARY OF THE INVENTION

However, with the technique disclosed in JP 2006-004346 A, only the operation name, start time, and end time are subject to analysis in the event record, and therefore business process and job identification information is lost. Hence, event records cannot be classified for each business process, and an analysis result in which all business processes and all jobs are mixed together is obtained.

Further, with the technique disclosed in JP 2005-062963 A, event records are classified according to a hierarchical structure such that high order event records correspond to business processes and low order event records correspond to operations. Further, the information held in the event records is constituted by the business process name, the operation name, the start time, and the end time. However, job identification information is not held in the event record, and therefore only a time series pattern mixing together information regarding all jobs can be extracted.

The present invention focuses on such problems, and it is an object thereof to use information regarding each instance included in an event log effectively to analyze a time series pattern of a specified business process.

A representative aspect of this invention is as follows. That is, there is provided a time series pattern generating system for analyzing history information of an instance, which is generated when one or more components having a defined order are executed in accordance with a class defining a series of processes, the class being constituted by the one or more components, and generating a time series pattern on the basis of a result of the analysis of the history information, comprising: a storage system which stores the history information; and a computer which generates the time series pattern on the basis of the history information, the computer comprising a processor, a memory connected to the processor, an input module into which the history information is input, and an output module which outputs the time series pattern, and the history information being generated upon execution of the components, which are stored in the storage system in chronological order of generation, and including a class identifier, a component identifier, an instance identifier, and information indicating a processing time of the components, in which the time series pattern generating system comprises: a history information generation module which extracts history information having an identical instance identifier and generates instance history information; a processing order information generation module which creates component processing order information relating to an instance generated upon execution of the components on the basis of the generated instance history information; and a time series pattern generation module which estimates a dependence relationship between the components on the basis of the created processing order information and generates a time series pattern including a processing order of the components.

Here, a component denotes an individual operation of a business. A class defines a series of processes combining a plurality of components. An instance is a process defined in the class that has actually been executed. For example, in "payment slip processing" involving "product input", "amount input", and "acceptance", "product input", "amount input", and "acceptance" correspond to components and the "payment slip processing" corresponds to a class. The "payment slip processing" business is executed in accordance with the defined class, and an instance is generated for every job, such as "a job in which a product A was processed at a module price a" and "a product B was processed at a module price b". Further, executing a process in accordance with a class means executing the components included in the class.

Meanwhile, a time series pattern is obtained by estimating and extracting a component processing order or the like on the basis of time series data included in history information generated upon execution of an instance. It should be noted that a time series pattern includes a pattern in which the extracted component processing order or the like is expressed as a directed graph.

According to an embodiment of this invention, history information can be analyzed in business process units, and moreover, the history information of each instance of a business process can be used effectively to extract dependence relationships between operations constituting the business process and generate a time series pattern.

BRIEF DESCRIPTION OF THE DRAWINGS

The present invention can be appreciated by the description which follows in conjunction with the following figures, wherein:

FIG. 4 is an explanatory diagram showing an event log according to the embodiment of this invention;

FIG. 6A and FIG. 6B are an explanatory diagrams showing an intermediate data of event records extracted from an event log and including the specified business process, according to the embodiment of this invention;

FIG. 7A to FIG. 7D are an explanatory diagrams showing an event log for each instance according to the embodiment of this invention;

FIG. 9 is an explanatory diagram showing an operation dependence relationship matrix of an instance, according to the embodiment of this invention;

FIG. 10 is an explanatory diagram showing a procedure for extracting dependence relationships between operations constituting a specified business, according to the embodiment of this invention;

FIG. 14 is an explanatory diagram showing an operation-to-operation transition probability matrix for each instance, according to the embodiment of this invention;

FIG. 15B is an explanatory diagram showing an operation-to-operation transition probability matrix which is generated according to the embodiment of this invention.

DETAILED DESCRIPTION OF THE PREFERRED EMBODIMENTS

An embodiment of this invention will be described below on the basis of the attached drawings.

Figure 1:
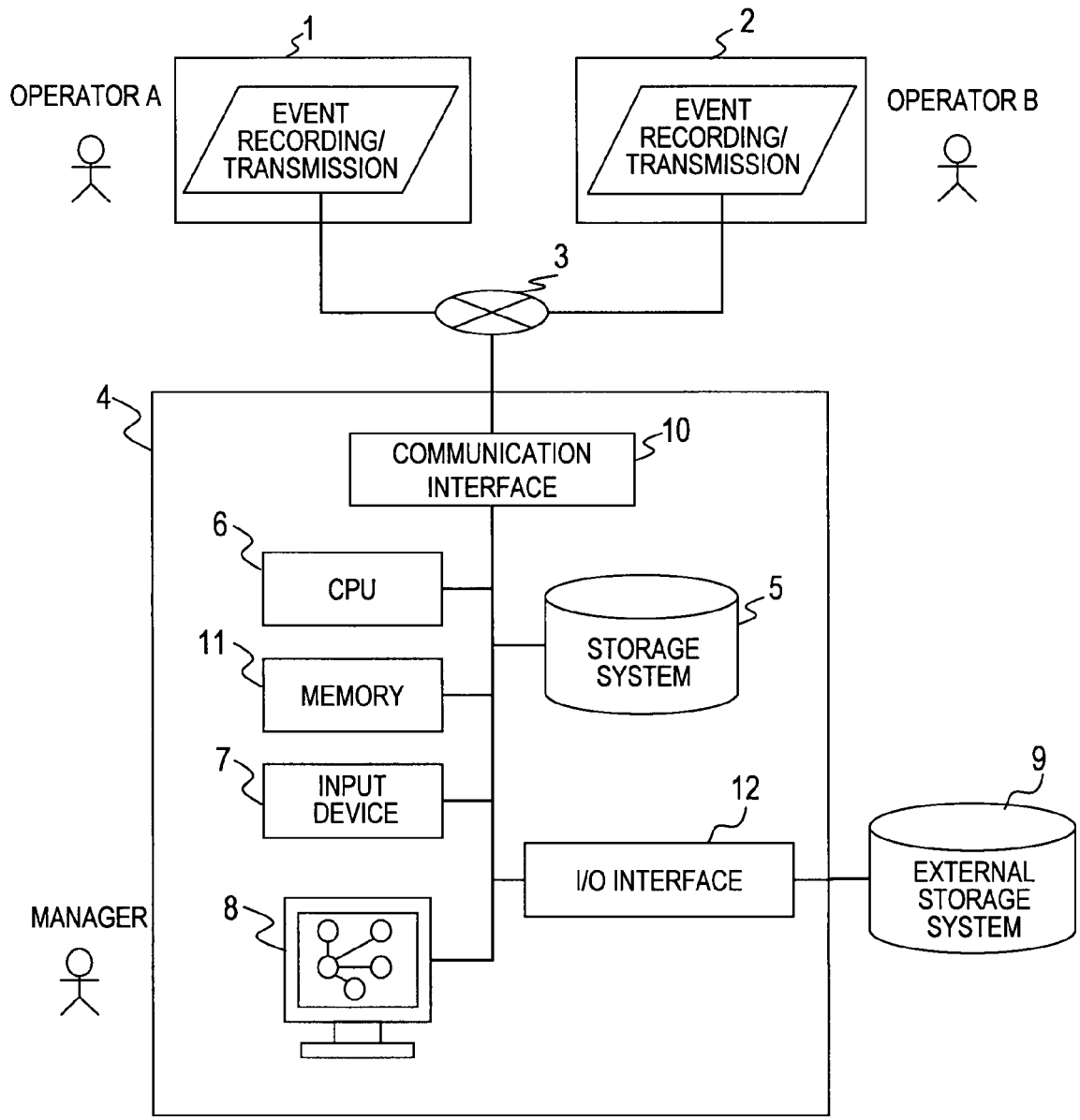
FIG. 1 is a block diagram showing a time series pattern generating system according to an embodiment of this invention.

FIG. 1 is a system diagram of a time series pattern generating system according to the embodiment of this invention. The time series pattern generating system comprises an operating terminal 1, an operating terminal 2 and a management terminal 4. In an embodiment of this invention, two operating terminals are provided, but the number of operating terminals is arbitrary. The operating terminals 1, 2 and the management terminal 4 are connected by a network 3. The network 3 is an IP network, for example.

The operating terminals 1 and 2 are computers used by an operator to execute a business. The hardware configuration thereof is identical to that of the management terminal 4 to be described below. The operating terminals 1 and 2 record an operation history (event record) of an operator and transmit the event record to the management terminal 4 over the network 3.

The management terminal 4 tabulates and analyzes received event records. The management terminal 4 comprises a CPU 6, memory 11, an input device 7, an output device 8, a communication interface 10, a storage system 5, and an I/O interface 12.

The CPU 6 executes various processes by executing a program stored in the memory 11. The memory 11 stores the program executed by the CPU 6 and data required for the processes. The communication interface 10 connects to the network 3 to receive event records transmitted from the operating terminals 1, 2. The storage system 5 accumulates received event records in chronological order, and stores them in an event log.

The I/O interface 12 is connected to an external storage system 9. The I/O interface 12 and external storage system 9 are connected by a SAN (Storage Area Network), for example. The external storage system 9 is capable of storing event log analysis results and so on as needed.

The input device 7 is a keyboard, a mouse, or similar, for example, and inputs commands instructing event log analysis or the like, analysis parameters, and so on. The output device 8 is a display, a printer, or similar, for example, and outputs a time series pattern generated through analysis of the event log.

Figure 2:
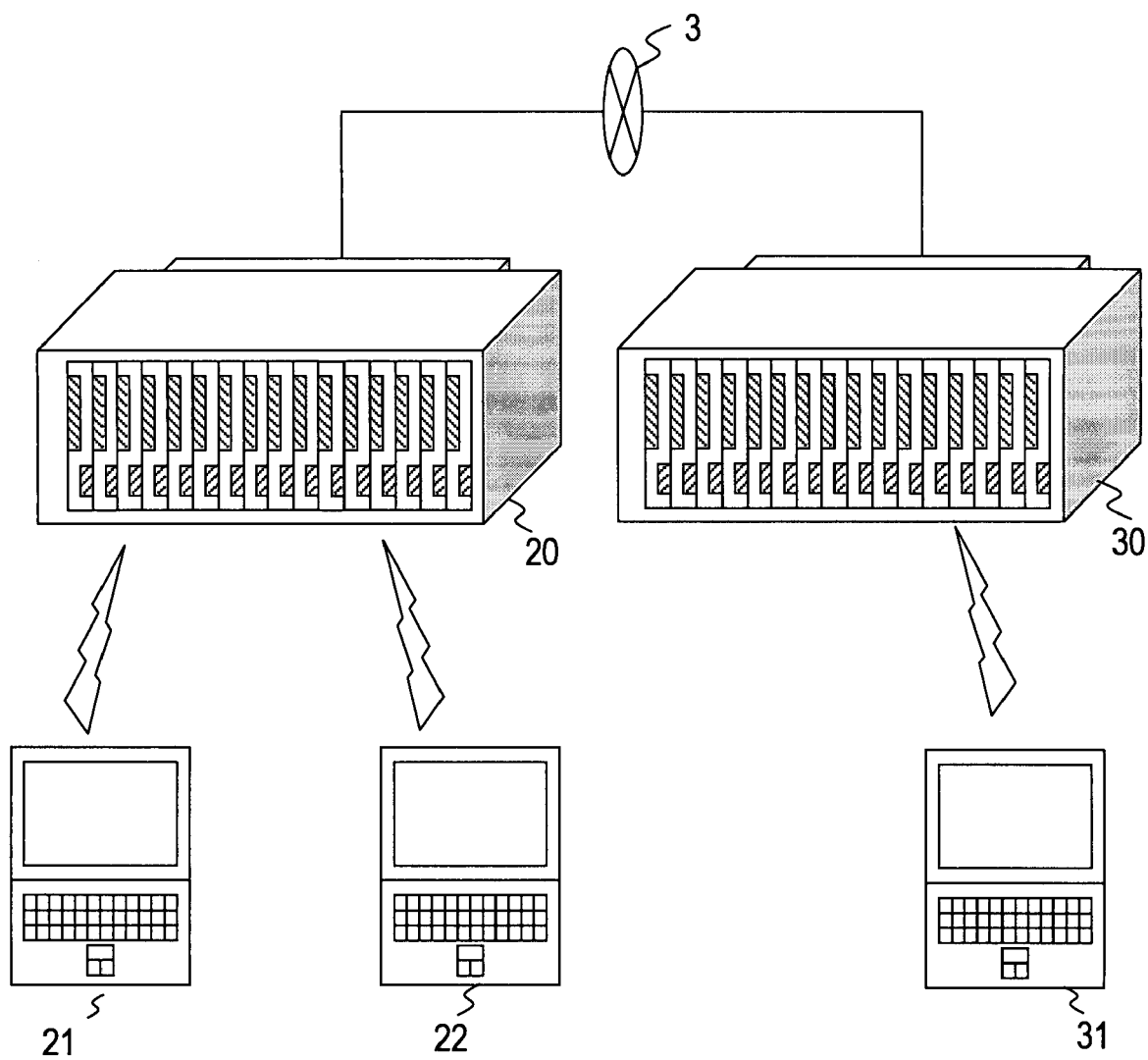
FIG. 2 is a configuration diagram showing a modified example of the hardware configuration according to the embodiment of this invention.

FIG. 2 shows a modified example of the hardware configuration according to the embodiment of this invention. The operator operates a business computer 20 via the network 3 using an operating terminal 21 and an operating terminal 22. The business computer 20 records an operating history as an event record, and transmits the event record to an analysis computer 30 over the network 3.

The analysis computer 30 generates a time series pattern on the basis of the event log transmitted from the business computer 20 and in accordance with a command transmitted from a manager operating terminal 31 via the network 3, and transmits the generated time series pattern to the manager operating terminal 31 over the network 3. The manager operating terminal 31 displays the received time series pattern.

Figure 3:
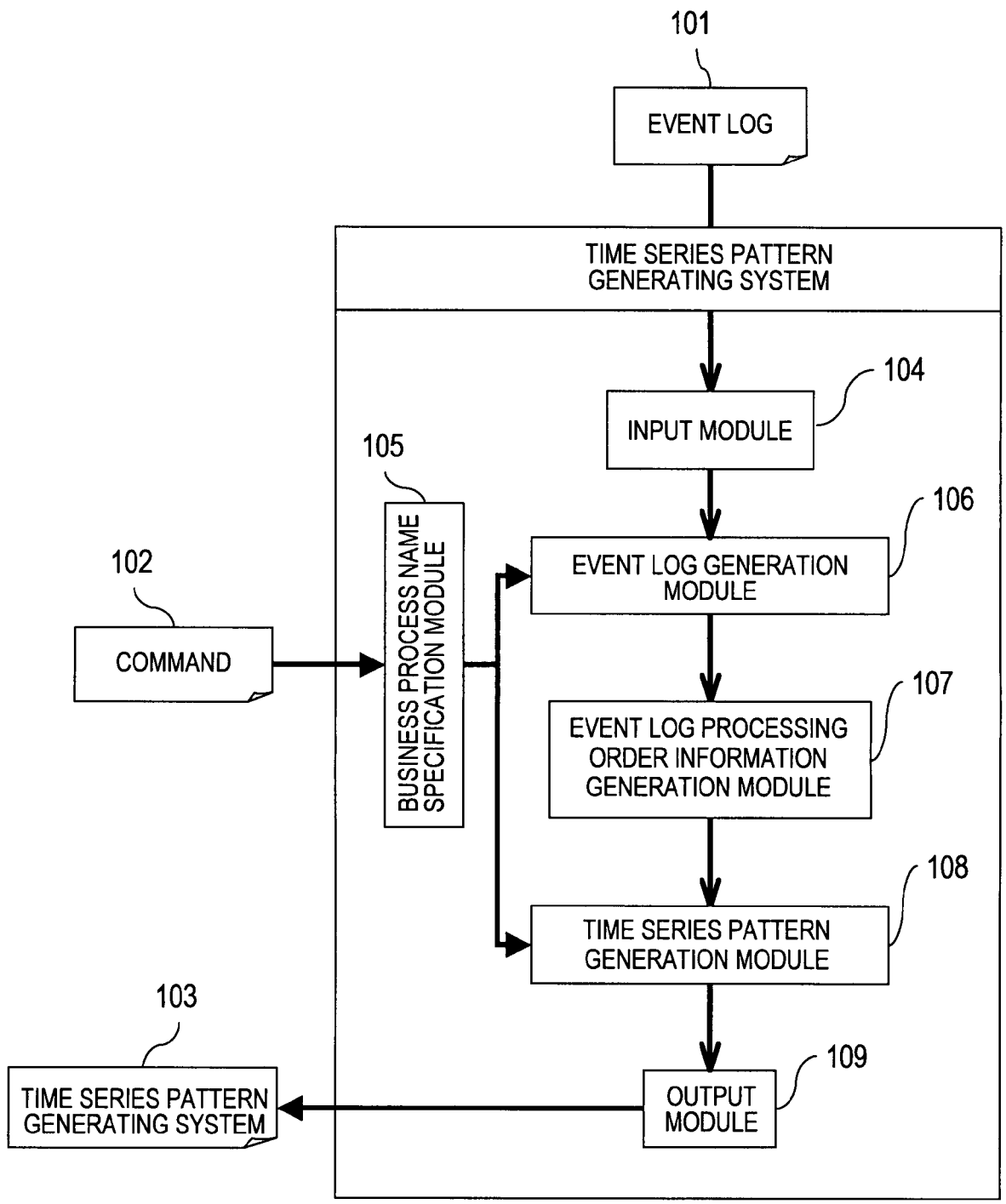
FIG. 3 is a block diagram showing the time series pattern generating system according to the embodiment of this invention.

FIG. 3 is a block diagram of the time series pattern generating system according to the embodiment of this invention. The time series generating system according to an embodiment of this invention comprises an input module 104, a business process name specification module 105, an event log generation module 106, an event processing order information generation module 107, a time series pattern generation module 108, and an output module 109.

The input module 104 receives input of an event log 101 stored in the storage system 5. The business process name specification module 105 receives a command 102 including the name of an analysis subject business process input through the input device 7 of the management terminal 4.

In accordance with the command 102, the event log generation module 106 extracts only an event record including identification information relating to a required instance from the input event log 101. An instance is an actually executed business process, and instance identification information is information identifying each instance when an identical business process is executed. The event processing order information generation module 107 derives an operation processing order of each instance from the extracted event record of the instance, and generates event processing order information.

The time series pattern generation module 108 generates the time series pattern specified by the command 102 from the event processing order information generated by the event processing order information generation module 107. The output module 109 outputs the generated time series pattern 103 to the output device 8.

The time series pattern generation module 108 is capable of generating the time series pattern 103 in a plurality of types. For example, the generated time series pattern 103 may be generated on the basis of a dependence relationship, i.e. the operation processing order, on the basis of the probability of a specific operation being processed immediately after a certain operation (an operation-to-operation transition probability), and so on.

Here, an operation A and an operation B always exist in the analysis subject business process, and when the operation A is processed before the operation B in every instance, B is defined as being dependent on A. On the other hand, in an analysis subject business process including the operation A and the operation B, a number obtained by dividing the number of instances in which the operation B is processed immediately after the operation A by the total number of instances is defined as the transition probability from A to B. The time series pattern generation module 108 generates the time pattern series 103 by extracting a dependence relationship or a transition probability with regard to all combinations of operations constituting the specified business process.

FIG. 4 is a view showing the event log 101 according to the embodiment of this invention. An event record 207 is generated by recording an operation performed by the operator on the an operating terminal 1 and an operating terminal 2. As described above, the event record 207 is transmitted from the operating terminals 1 and 2 to the management terminal 4, and stored in the storage system 5 by the input module 104. The event log 101 is a collection of the event records 207 stored in chronological order. The event record 207 includes a start time 201, an end time 202, a business process name 203, instance identification information 204, an operation name 205, and an operator ID 206. The event record 207 is recognized uniquely by the business process 203, instance identification information 204, and operation name 205.

The start time 201 is the start time of an operation. The end time 202 is the end time of the operation. The start time 201 and end time 202 are measured in millisecond units.

The business process name 203 stores a name identifying the business. The instance identification information 204 is an identifier identifying a business that has been executed a plurality of times. The operation name 205 is the name and identifier of an operation included in the business. The operator ID 206 is an identifier identifying the operator who performs the business.

Figure 5:
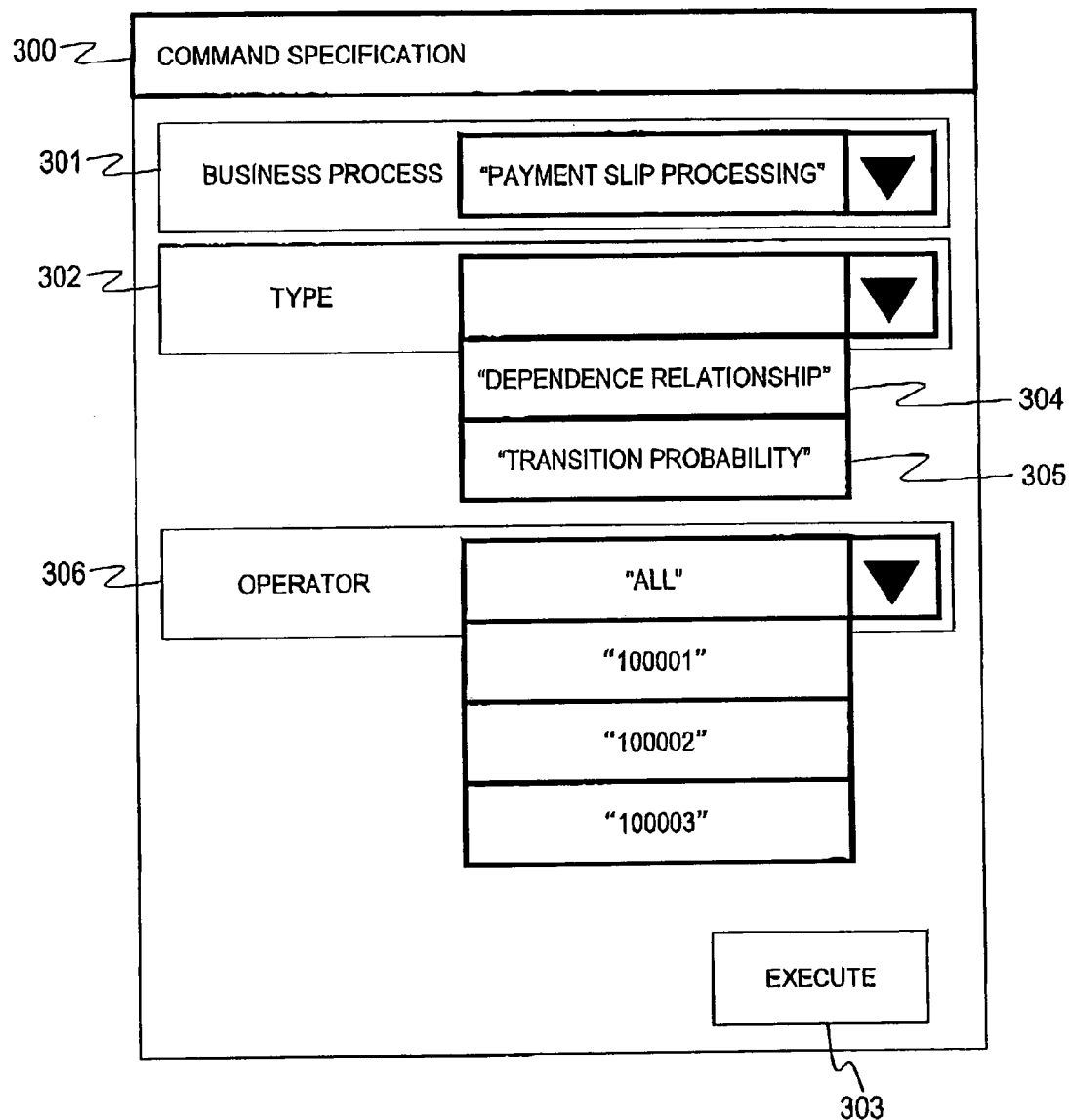
FIG. 5 is an explanatory diagram showing an example of a command specification screen for transmitting the command to the business process name specification module, according to the embodiment of this invention.

FIG. 5 is a view showing an example of a command specification screen 300 for transmitting the command 102 to the business process name specification module 105, according to the embodiment of this invention. A manager inputs required items onto the command specification screen 300 and transmits these items to the business process name specification module 105. In an embodiment of this invention, a business process 301, a type 302, and an operator 306 can be specified.

In the business process 301, a business to be subjected to analysis is selected. In FIG. 5, "payment slip processing" is selected. In the type 302, the type of analysis is specified. As shown in FIG. 5, a dependence relationship 304 and a transition probability 305 are specified in the analysis type, for example. As described above, the dependence relationship is the operation processing order, and the transition probability is the probability of advancing to another operation following the completion of a specific operation.

In the operator 306, the event log is analyzed by specifying an operator for performing the business. When analysis of an entire business process is required, "all operators" is selected, and when analysis is to be performed by specifying an individual operator, an operator ID is specified.

When an execute button 303 on the command specification screen 300 is operated, the business process name specification module 105 receives the specified information and transmits this information to the event log generation module 106 and time series pattern generation module 108.

A procedure for generating the time series pattern 103 will now be described. In the command 102 received by the business process name specification module 105, "payment slip processing" is specified as the business process 301, and "all operators" is specified as the operator 306. An example in which "dependence relationship" is specified as the type and an example in which "transition probability" is specified as the type will both be described.

FIG. 6A, to FIG. 7D are views showing event logs and intermediate data for each instance, which are generated by the event log generation module 106 according to the embodiment of this invention.

FIG. 6A and FIG. 6B are views showing the intermediate data of event records extracted from an event log and including the specified business process, according to the embodiment of this invention.

The event log generation module 106 extracts the event records 207 including the business process 203 that matches the specified business process. Intermediate data 402 are data in the extracted event records 207 matching the business process "payment slip processing" specified by the business process name specification module 105.

It should be noted that when an operator is specified, the event records 207 including the operator ID 206 of the specified operator are extracted.

FIG. 7A to FIG. 7D are views showing an event log for each instance according to an embodiment of this invention.

The event log generation module 106 divides the event records 207 having the intermediate data 402 including the specified business process into groups corresponding to each set of instance identification information 204. In FIG. 7A to FIG. 7D, the intermediate data 402 are divided and grouped in an event log 403 of an instance 1, an event log 404 of an instance 3, and an event log 405 of an instance 4.

When an event log is generated for each instance by the event log generation module 106, the event processing order information generation module 107 generates event processing order information for each instance from the event log for each instance. The event processing order information for each instance is information indicating the operation processing order in each instance.

When the end time of the operation A is earlier than the end time of the operation B, A->B is expressed as the event processing order information, indicating that the operation A is performed before the operation B. Accordingly, "A->B->C->D->E->F" is generated from the event log 403 as the event processing order information of the instance 1. Similarly, the event processing order information of the instance 3 becomes "A->C->B->D->F->E", and the event processing order information of the instance 4 becomes "C->A->B->D->E->F".

Figure 8:
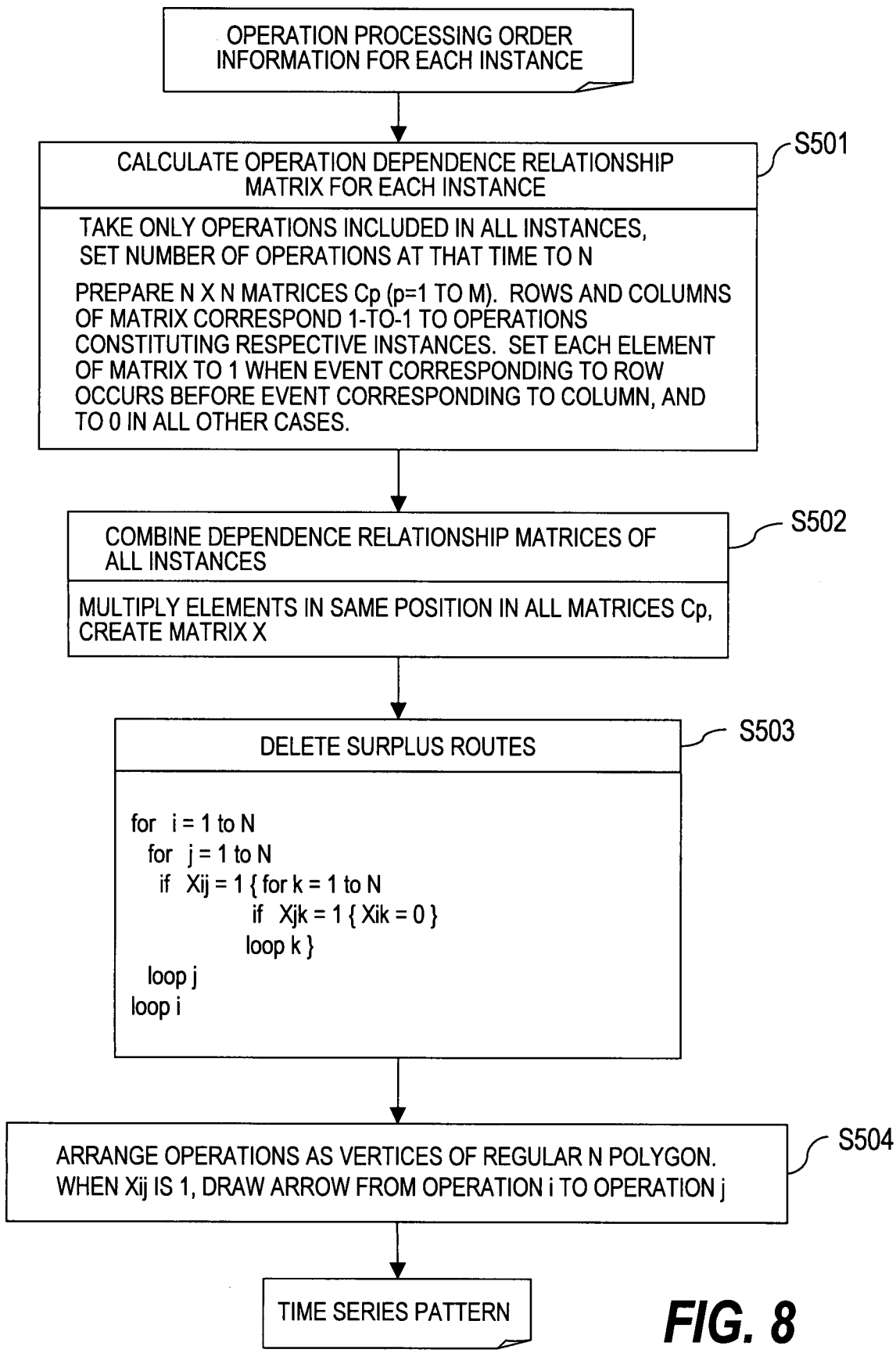
FIG. 8 is a flowchart illustrating a processing when "dependence relationship" is specified as the type of time series pattern, according to the embodiment of this invention.

FIG. 8 is a flowchart illustrating a processing order of the time series pattern generation module 108 when "dependence relationship" is specified as the type of time series pattern, according to the embodiment of this invention.

Upon reception of the event processing order information, the time series pattern generation module 108 generates an operation dependence relationship matrix for each instance (S501). Referring to FIG. 9, processing (S501) performed by the time series pattern generation module 108 to generate an operation dependence relationship matrix for each instance will now be described.

FIG. 9 is a view showing an operation dependence relationship matrix of an instance, according to the embodiment of this invention. A matrix X1 (601), a matrix X2 (602), and a matrix X3 (603) are operation dependence relationship matrices for the instance 1, the instance 3, and the instance 4, respectively.

First, the time series pattern generation module 108 determines the subject operations to be included in the operation dependence relationship matrix. Only operations included in all instances become subject elements of the operation dependence relationship matrix. In an embodiment of this invention, all of the operations (A, B, C, D, E, and F) become subjects.

In the operation dependence relationship matrix, each row and each column corresponds respectively to an operation. The dependence relationship between operations is expressed as 1 when a row operation is performed before a column operation, and 0 in all other cases.

In an embodiment of this invention, the payment slip processing serving as the analysis subject is constituted by six operations, and therefore the operation dependence relationship matrix has six rows and six columns. Hence, both the first row and the first column of the operation dependence relationship matrix denote the operation A, the second row and second column denote the operation B, ..., and the sixth row and sixth column denote an operation F.

As described above, the event processing order information of the instance 1 is A->B->C->D->E->F. The operation A is performed before all of the operations except for A itself, and therefore, of the elements on the first row indicating A, 0 is inserted in the first column expressing A alone, and 1 is inserted into all of the other columns. The operation B is performed before four operations, i.e. all operations other than A and B, and therefore, of the elements on the second row indicating the operation B, 0 is inserted into the first and second columns, and 1 is inserted into the third through sixth columns. This processing is executed in relation to all of the operations, and thus the operation dependence relationship matrix X1 (601) of the instance 1 is generated. The time series pattern generation module 108 generates the operation dependence relationship matrix X2 (602) of the instance 3 and the operation dependence relationship matrix X3 (603) of the instance 4 similarly.

Next, the time series pattern generation module 108 extracts a common processing order of each operation from the generated operation dependence relationship matrices 601, 602 and 603 (S502).

Here, even when a relationship of A->B is established in a certain instance, a dependence relationship of A->B is not established unless A->B is established in another instance. Further, in the operation dependence relationship matrix, 1 is inserted when a dependence relationship is established, and 0 is inserted in all other cases, and therefore, when the products of the elements corresponding to all of the operation dependence relationship matrices are calculated, the value of an element becomes 1 only when a dependence relationship is established in each matrix.

FIG. 10 is a view showing a procedure for extracting dependence relationships between operations constituting a specified business, according to the embodiment of this invention.

The time series pattern generation module 108 calculates the product of each element in the operation dependence relationship matrix X1 (601) and the operation dependence relationship matrix X2 (602) to obtain a matrix X4 (702). In the matrix X4 (702), only the elements for which a dependence relationship is established in both the instance 1 and the instance 3 take a value of 1. More specifically, both the instance 1 and the instance 3 begin from the operation A, and therefore the first row of the matrix X4 (702) is identical to the first row of X1 (602) and X2 (602). On the other hand, in the instance 1 the operation B follows the operation A, whereas in the instance 2, the operation C follows the operation A. In other words, the processing order is B->C in the instance 1 and C->B in the instance 3, and therefore a dependence relationship is not established between the operation B and the operation C. Hence, with respect to the matrix X4, a preceding relationship cannot be specified for an element (2, 3) indicating B->C and an element (3, 2) indicating C->B, and therefore both of these elements are set at 0.

Further, the time series pattern generation module 108 calculates the product of each element in the matrix X4 (702) and the operation dependence relationship matrix X3 (603) to obtain a matrix X5 (703). The obtained matrix X5 (703) illustrates dependence relationships established between the instance 1, the instance 3, and the instance 4.

Next, the time series pattern generation module 108 orders the extracted dependence relationships (S503 in FIG. 8). A specific procedure of this operation will be described below with reference to FIG. 11.

Figure 11:
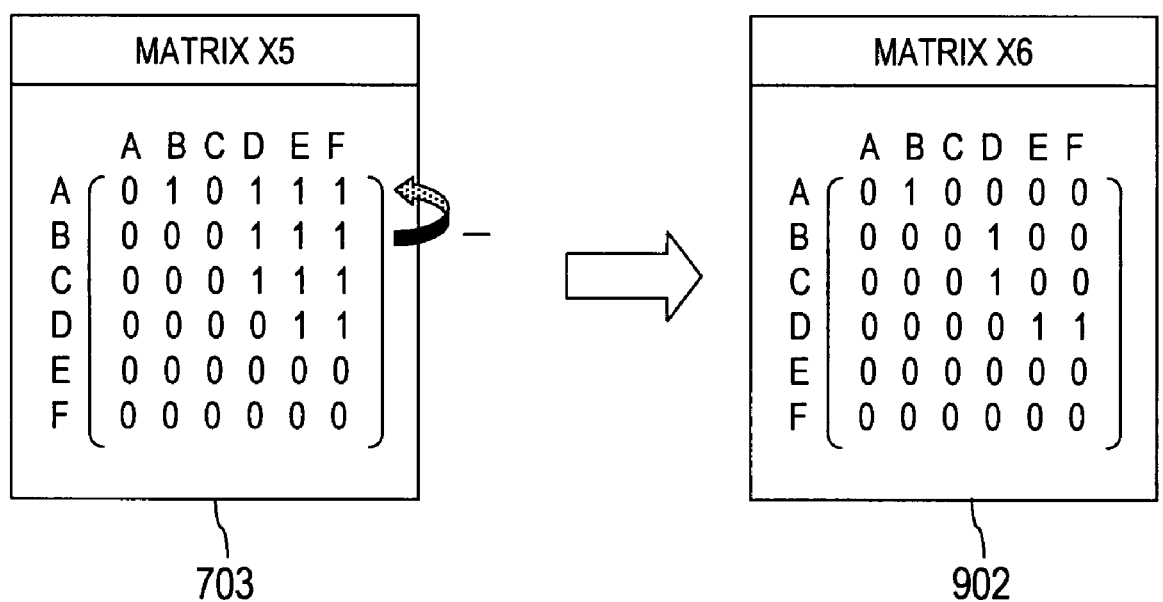
FIG. 11 is an explanatory diagram showing a procedure for ordering extracted dependence relationships, according to the embodiment of this invention.

FIG. 11 is a view showing a procedure for ordering extracted dependence relationships, according to the embodiment of this invention.

Referring to the matrix X5 (703), the value of an element (1, 4) is 1, and therefore A->D is established as a dependence relationship between the operations A and D. Similarly, the value of an element (1, 2) is 1, and therefore A->B is established as a dependence relationship between the operations A and B, while the value of an element (2, 4) is 1, and therefore B->D is established as a dependence relationship between the operations B and D. Here, it is self-evident that when a dependence relationship of A->B->D is established, a dependence relationship of A->D is also established, and therefore, even when the value of the element (1, 4) in the matrix X5 is 0, the dependence relationship of A->B->D is maintained.

In the processing of S503 in FIG. 8, as described above, the matrix X5 is ordered such that only the minimum number of dependence relationships at which the dependence relationships between the various operations can be maintained is left. A procedure for deriving a matrix X6 (902) showing the minimum number of dependence relationships from the matrix X5 (703) will now be described in accordance with an algorithm shown in S503 of FIG. 8.

In the algorithm of S503, first, elements from a column 1 to a column N on a row i are checked in sequence, and when the value of an element in a column j is 1, the elements on a row j are checked. At this time, the column 1 to the column N on the row j are checked in sequence, and when the value of an element in the same column is 1 on both the row i and the row j, the value of the element on the ith row is altered from 1 to 0. The processing described above is identical to subtracting the value of each column on the j row from the value of each column on the i row.

Here, when the algorithm of S503 is applied to the matrix X5 in FIG. 11, the value of the element in column 2 of row 1 is 1. When the value of row 2 is checked in order from column 1 to column 6, the value in the columns 4 to 6 is 1 on both row 1 and row 2. Hence, it is learned that the operation A and the operation B are both processed before the operations D, E and F. Accordingly, even when the dependence relationships A->D, A->E, and A->F are deleted, the dependence relationships B->D, B->E, and B->F are maintained from the dependence relationship A->B, and therefore all of the dependence relationships are maintained. By ordering each row of the matrix X5 in a similar manner from row 2 onward using the procedure described above, an operation dependence relationship matrix X6 (902) can be generated.

Finally, the operation dependence relationship matrix X6 (902) is displayed in a time series pattern (S504 in FIG. 8). In an embodiment of this invention, the time series pattern is expressed by a directed graph having the operations as vertices and the dependence relationships as directed edges. More specifically, each operation is disposed as a vertex of a regular N polygon, and with respect to elements of the matrix X6 (902) having a value of 1, an arrow is drawn from the operation indicating the row of the element to the operation indicating the column of the element.

Figure 12:
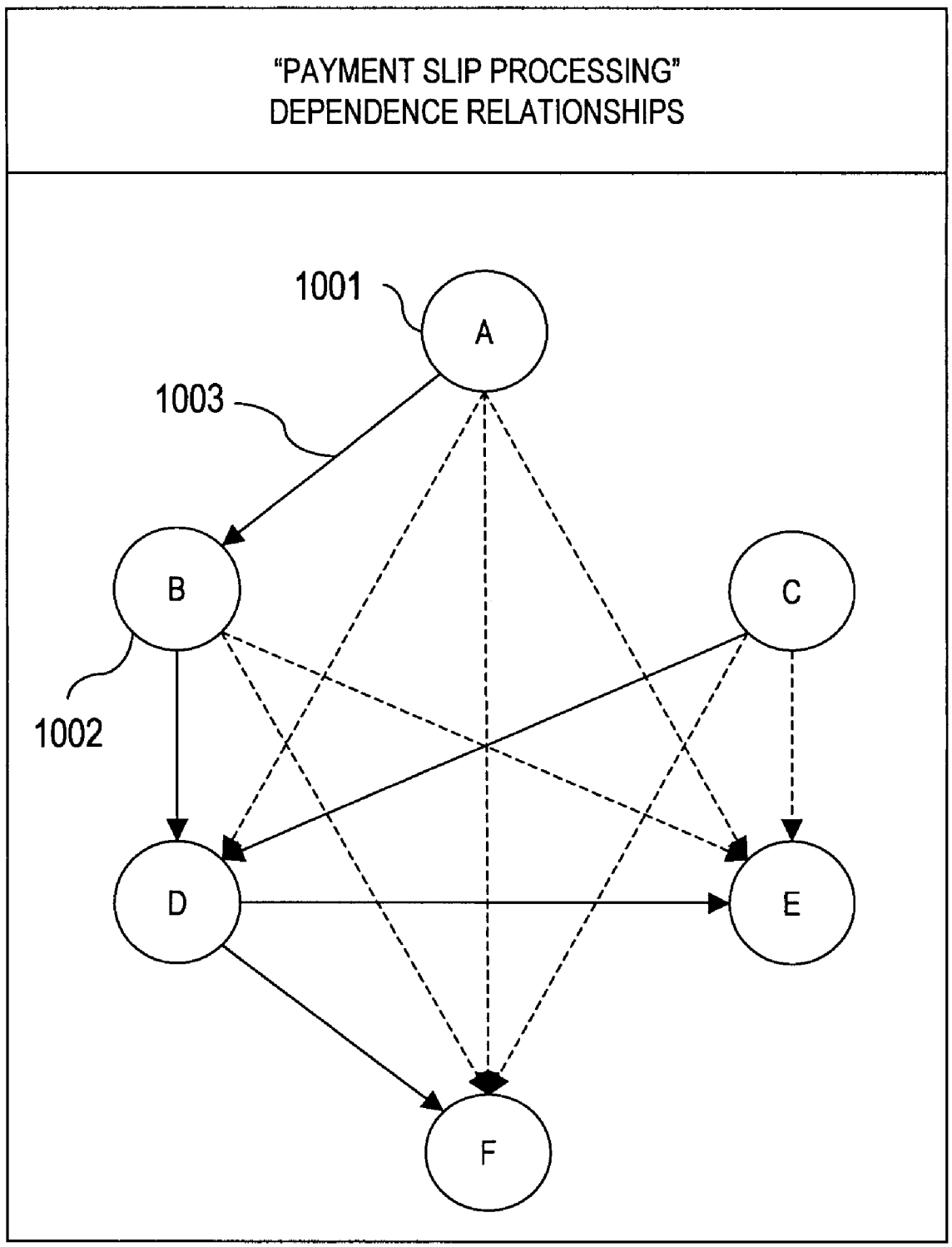
FIG. 12 is a view expressing a time series pattern in the form of a directed graph, according to the embodiment of this invention.

FIG. 12 is a view expressing a time series pattern according to an embodiment of this invention in the form of a directed graph. FIG. 12 is a directed graph expressing the time series pattern 103 obtained by specifying "payment slip processing" as the business process name, "dependence relationship" as the type, and "all" as the operator, and analyzing the event log 101 shown in FIG. 4. The solid line arrows denote dependence relationships, and the broken line arrows denote dependence relationships deleted in the processing of S503 in FIG. 8.

Referring to the matrix X6 (902), on the first row indicating the operation A, only the second column indicating the operation B is 1, and therefore an arrow 1003 is drawn from a vertex 1001 corresponding to the operation A to a vertex 1002 corresponding to the operation B. Dependence relationships are expressed similarly from the operation B to the operation F. More specifically, the fourth column on the second row is 1, and therefore an arrow is drawn from B to D, while the fourth column on the third row is also 1, and therefore an arrow is drawn from C to D. As regards the fourth row, the fifth and sixth columns have a value of 1, and therefore arrows are drawn from D to E and F. Thus, the directed graph shown in FIG. 12 is obtained.

Next, a processing procedure performed by the time series pattern generation module 108 when the transition probability 305 is specified as the type 302 of the time series pattern on the command specification screen 300 in FIG. 5 will be described.

Figure 13:
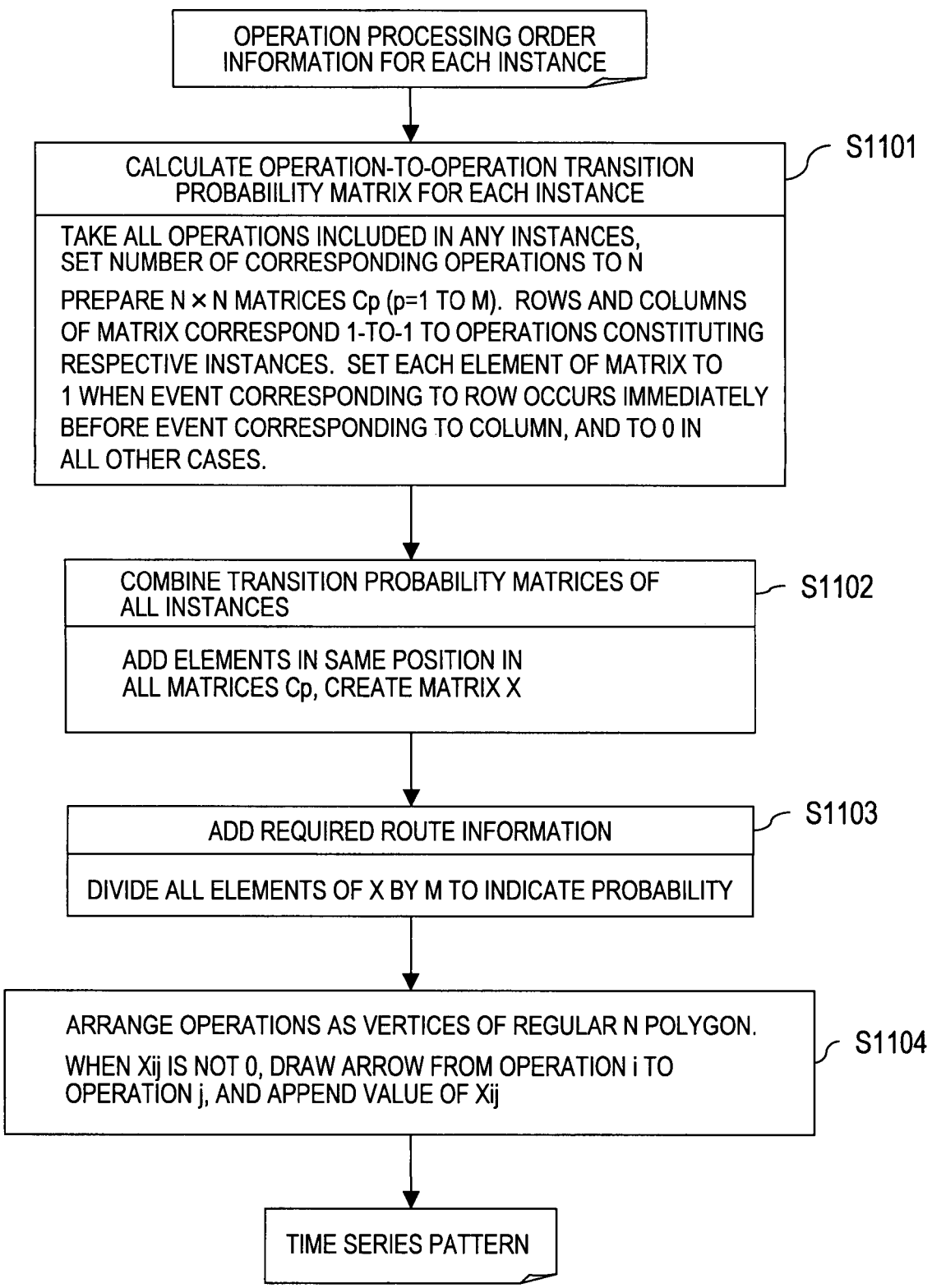
FIG. 13 is a flowchart illustrating a processing when "transition probability" is specified as the time series pattern analysis type, according to the embodiment of this invention.

FIG. 13 is a flowchart illustrating a processing procedure of the time series pattern generation module 108 when "transition probability" is specified as the time series pattern analysis type, according to the embodiment of this invention.

Upon reception of the event processing order information of an instance, the time series pattern generation module 108 calculates an operation-to-operation transition probability matrix for each instance (S1101). Here, referring to FIG. 14, a procedure performed by the time series pattern generation module 108 to generate an operation-to-operation transition probability matrix for each instance will be described.

Figure 14:
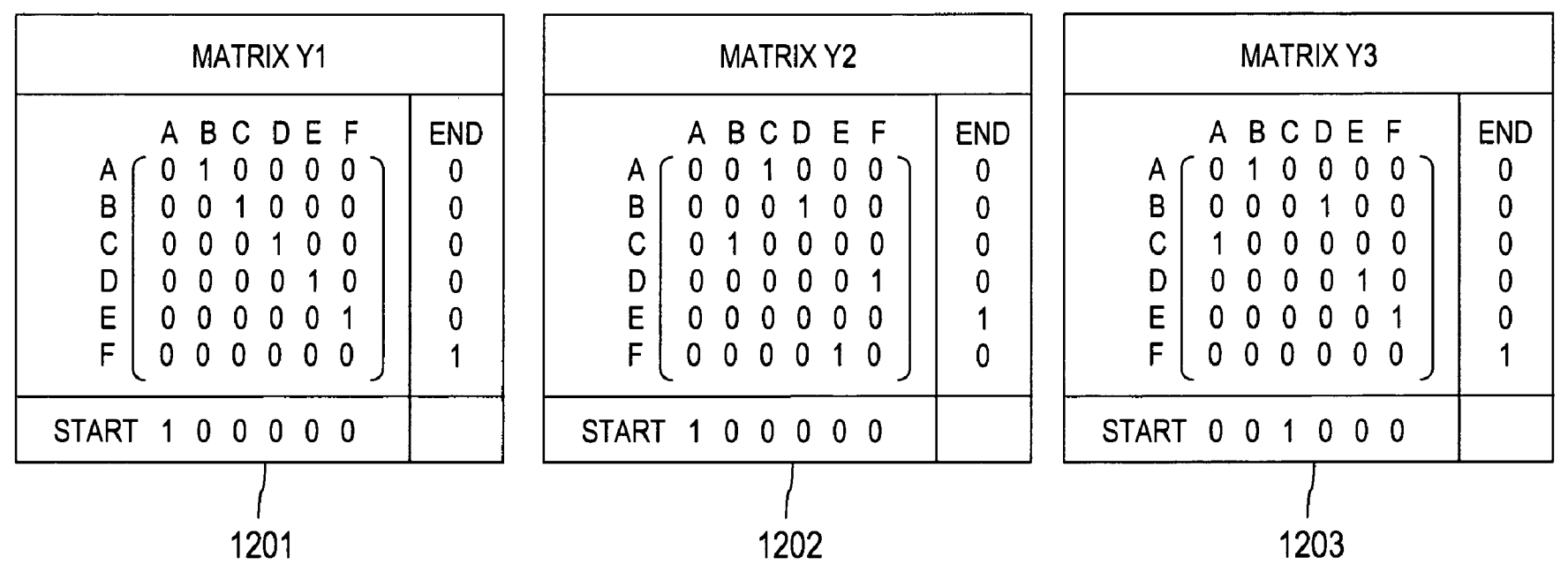

FIG. 14 is a view showing an operation-to-operation transition probability matrix for each instance, according to the embodiment of this invention. A matrix Y1 (1201), a matrix Y2 (1202), and a matrix Y3 (1203) are the operation-to-operation transition probability matrices of the instance 1, the instance 3, and the instance 4, respectively.

In contrast to the operation dependence relationship matrix, the elements constituting the operation-to-operation transition probability matrix are all of the operations included in any one or more of the processing subject instances. In an embodiment of this invention, the operations constituting the analysis subject instances are the same, and therefore all of the operations (A, B, C, D, E and F) become subjects.

In the operation-to-operation transition probability matrix, each row and each column corresponds to the respective operations, and moreover, a row corresponding to a dummy start operation (Start) and a column corresponding to a dummy end operation (End) are added. By adding the dummy start operation and end operation in this manner, the start operation and end operation can be clarified.

The value of each element in the operation-to-operation transition probability matrix is set such that in a row indicating a certain operation, only the column indicating the operation that is processed after the certain operation has a value of 1, and all other columns have a value of 0. For example, the event processing order information of the instance 1 is A->B->C->D->E->F. Hence, on the first row indicating the operation A, only an element (1, 2) in the second column indicating the operation B is set at 1, and the other elements are set at 0. Similarly, on the second row indicating the operation B, only an element (1, 3) in the third column indicating the operation C is set at 1, and the other elements are set at 0. Values are set similarly up to the sixth row indicating the operation F.

Further, on the row (Start) indicating the start, the element in the first column indicating the operation A of the start operation is set at 1, and the elements in the other columns are set at 0. In the column (End) indicating the end, the element on the sixth row indicating the operation F is set at 1, and the elements on the other rows are set at 0.

The time series pattern generation module 108 generates the operation-to-operation transition probability matrix Y1 (1201) in this manner. Further, the time series pattern generation module 108 generates an operation-to-operation transition probability matrix Y2 (1202) from the event processing order information of the instance 3, and an operation-to-operation transition probability matrix Y3 (1203) from the event processing order information of the instance 4.

Next, the time series pattern generation module 108 combines the generated operation-to-operation transition probability matrices (1201 to 1203) (S1102).

Figure 15A:
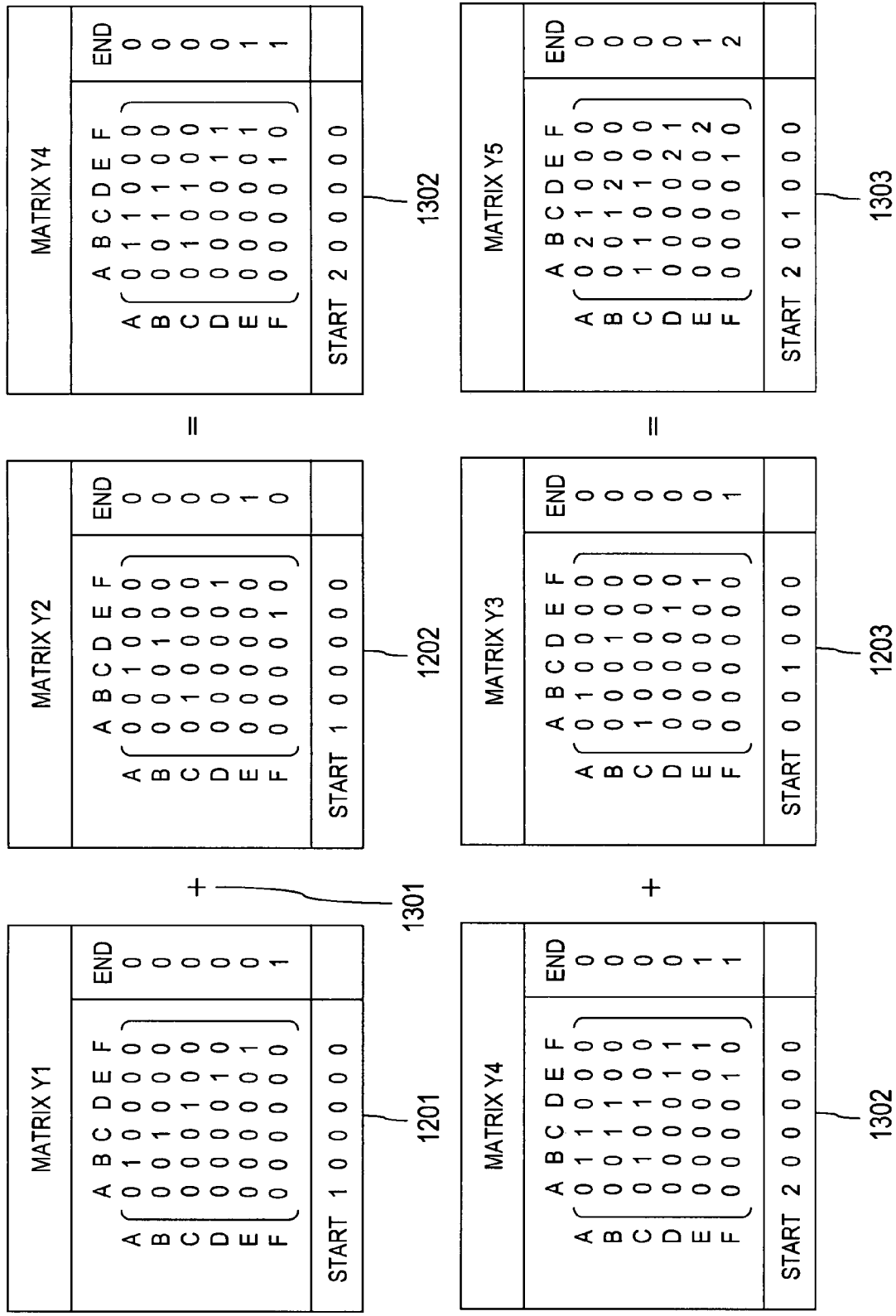
FIG. 15A is an explanatory diagram showing a procedure for combining generated operation-to-operation transition probability matrices, according to the embodiment of this invention.

FIG. 15A is a view showing a procedure for combining generated operation-to-operation transition probability matrices, according to the embodiment of this invention.

In the procedure for combining the operation-to-operation transition probability matrices, the elements of the corresponding matrices are added together respectively (1301). This applies likewise to the row (Start) indicating the start operation and the column (End) indicating the end operation. Referring to FIG. 15A, by adding together the matrix Y1 (1201) and the matrix Y2 (1202), a matrix Y4 (1302) can be generated. Further, by adding together the matrix Y4 (1302) and the matrix Y3 (1203), a matrix Y5 (1303) can be generated.

Further, the time series pattern generation module 108 divides each element of the matrix Y5 by the number of instances M serving as processing subjects to calculate an operation-to-operation transition probability matrix (S1103 in FIG. 13).

FIG. 15B is a view showing an operation-to-operation transition probability matrix Y6 generated according to the embodiment of this invention. The operation-to-operation transition probability matrix Y6 is obtained by dividing the matrix Y5 in FIG. 15A by the number of instances M (=3). Referring to row 1 corresponding to the operation A in the operation-to-operation transition probability matrix Y6, it is learned that when the operation A is complete, there is a ⅔ probability of a transition to the operation B, and a ⅓ probability of a transition to the operation C. Further, referring to row 7 indicating the start operation (Start), there is a ⅔ probability that the analysis subject "payment slip processing" will start from the operation A, and a ⅓ probability that that the "payment slip processing" will start from the operation C.

Finally, a time series pattern based on the operation-to-operation transition probability matrix Y6 is displayed (S1104 in FIG. 13). The time series pattern is expressed by a directed graph in which the operations are set as vertices and operations having a transition probability greater than 0 are connected. In the time series pattern, each operation is disposed as a vertex of a regular N polygon, and Start and End are disposed in arbitrary positions. When an element of the operation-to-operation transition probability matrix Y6 is greater than 0, an arrow indicating the value (transition probability) of the element is drawn.

Figure 16:
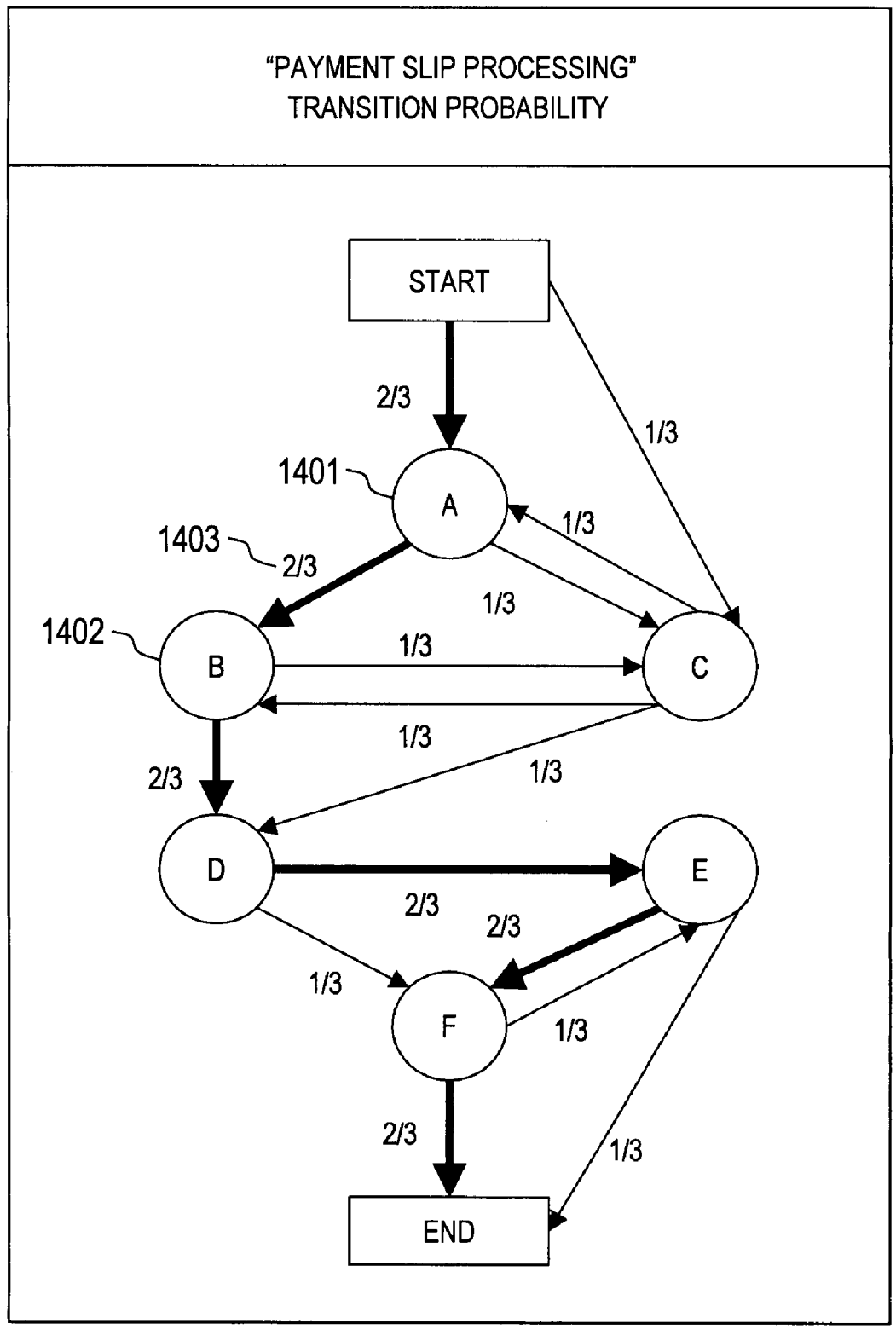
FIG. 16 is an explanatory diagram showing a time series pattern corresponding to the operation-to-operation transition probability matrix, according to the embodiment of this invention.

FIG. 16 is a view showing a time series pattern corresponding to the operation-to-operation transition probability matrix Y6, according to the embodiment of this invention.

The value of an element (1, 2) in the operation-to-operation transition probability matrix Y6 is greater than 0, and therefore an arrow 1403 is drawn from a vertex 1401 indicating the operation A to a vertex 1402 indicating the operation B. Further, a transition probability of "⅔" is appended to the arrow 1403. By drawing arrows similarly with respect to other elements having a value greater than 0 and appending the transition probability thereto, the time series pattern shown in FIG. 16 can be obtained.

According to an embodiment of this invention, dependence relationships between operations constituting a business can be extracted. Furthermore, these dependence relationships can be visualized as a time series pattern, and therefore the dependence relationships between the operations can be understood easily. For example, using the obtained time series pattern, an operation causing a bottleneck in the analysis subject business can be extracted. Then, by improving the operation causing the bottleneck, an overall improvement in the business can be achieved.

Further, according to an embodiment of this invention, the transition probability of a specific operation being processed immediately after a certain operation can be obtained for each operation constituting the business. Moreover, the operation-to-operation transition probabilities can be visualized as a time series pattern, which is valuable for analyzing and improving the operation order of a business.

Further, according to an embodiment of this invention, a time series pattern can be extracted for each operator, and therefore irregularities in the operation order according to the operator can be prevented, enabling standardization of the business process and an improvement in the quality of the business.

This invention may be applied to a system for analyzing a business on the basis of operation history information. Since history information can be extracted for each instance, this invention is particularly suitable for application to a system in which history information for a plurality of businesses is mixed together.

While the present invention has been described in detail and pictorially in the accompanying drawings, the present invention is not limited to such detail but covers various obvious modifications and equivalent arrangements, which fall within the purview of the appended claims.

What is claimed is:

1. A time series pattern generating system for analyzing history information of an instance, which is generated upon execution of one or more components having a defined order in accordance with a class defining a series of processes, the class being constituted by the one or more components, and generating a time series pattern on the basis of a result of the analysis of the history information, comprising:

a storage system which stores the history information in chronological order of generation, the history information including, for each component of each instance, a class identifier, a component identifier, an instance identifier, and information indicating a processing time of a component of the one or more components identified by the component identifier; and a computer which generates the time series pattern on the basis of the history information, the computer comprising a processor, an input module into which the history information is input, and an output module which outputs the time series pattern, and a memory having computer-readable instructions stored thereon for execution by the processor to implement a device for generating the time series pattern, the device comprising:

a history information generation module which extracts a set of history information from the history information based on common instance identifiers for respective instances generated upon execution of the one or more components and generates instance history information;

a processing order information generation module which creates component processing order information for the one or more components relating to the respective instances on the basis of the generated instance history information; and a time series pattern generation module which estimates a dependence relationship between the one or more components on the basis of the created processing order information, expresses the dependence relationship using an adjacency matrix that represents each of the one or more components using a respective row and a respective column and indicates each dependence between the one or more components using a respective entry of the adjacency matrix, updates the adjacency matrix by minimizing a number of dependencies indicated in the adjacency matrix to obtain a processing order of the one or more components by removing indications of redundant dependencies from the adjacency matrix, and generates the time series pattern including the processing order of the one or more components, wherein the time series pattern generation module updates the adjacency matrix expressing the estimated dependence relationship by calculating a difference between a row representing a first component having a first processing order and a row representing a second component having a second processing order that is later than the first processing order.

2. The time series pattern generating system according to claim 1, wherein the time series pattern is also expressed as a directed graph representing each of the one or more components as a respective vertex and each dependence between the one or more components as a directed edge.

3. The time series pattern generating system according to claim 1, wherein each entry of the matrix enables recognition of whether or not the component represented by the corresponding row has an earlier processing order than the component represented by the corresponding column.

4. The time series pattern generating system according to claim 1, wherein
the class is a business process,
the one or more components are operations constituting the business process, and
the time series pattern generation module estimates a dependence relationship between the operations included in the business process, and generates a time series pattern on the basis of the estimated dependence relationship.

5. The time series pattern generating system according to claim 4, wherein the information indicating a processing time of the history information of each instance includes a start time and an end time of each of the operations constituting the business process.

6. The time series pattern generating system according to claim 4, wherein the computer receives specification of a business process for which the time series pattern is to be generated, and the time series pattern generation module generates a time series pattern for the specified business process.

7. The time series pattern generating system according to claim 4, wherein the history information includes an identifier of an operator responsible for executing the business process, and the time series pattern generation module generates a time series pattern of the one or more components generated by each operator.

8. The time series pattern generating system according to claim 4, wherein the time series pattern generation module estimates a transition probability of the operations, and generates a time series pattern including the transition probability.

9. The time series pattern generating system according to claim 8, wherein the computer receives an instruction to generate a time series pattern including the component processing order or the transition probability, and the time series pattern generation module generates the instructed time series pattern.

10. A time series pattern generating system for analyzing history information generated upon execution of a business process constituted by one or more operations and defining a series of processes, and generating a time series pattern, comprising:
a storage system which stores the history information in chronological order, the history information including, for each operation of each instance of the business process, a business process identifier, an operation identifier, an instance identifier, and information indicating a processing time of an operation of the one or more operations identified by the operation identifier; and
a computer which generates the time series pattern on the basis of the history information,
the computer comprising a processor, an input module into which the history information is input, and an output module which outputs the time series pattern, and a memory having computer-readable instructions stored thereon for execution by the processor to implement a device for generating the time series pattern,
wherein the device is configured to:
extract a set of history information from the history information based on common instance identifiers for respective instances and generate instance history information;
create processing order information relating to the one or more operations of the respective instances on the basis of the generated instance history information;
estimate a dependence relationship between the one or more operations on the basis of the created processing order information, express the dependence relationship using an adjacency matrix that represents each of the one or more operations using a respective row and a respective column and indicates each dependence between the one or more operations using a respective entry of the adjacency matrix, minimize a number of dependencies indicated in the adjacency matrix to obtain a processing order of the one or more operations by removing indications of redundant dependencies from the adjacency matrix, and generate the time series pattern including the processing order of the one or more operations; and
update the adjacency matrix expressing the estimated dependence relationship by calculating a difference between a row representing a first component having a first processing order and a row representing a second component having a second processing order that is later than the first processing order.

11. A time series pattern generating method for analyzing history information generated upon execution of a business process constituted by one or more operations and defining a series of processes, and generating a time series pattern,
the time series pattern generating method being implemented by a computer comprising a processor and a memory having computer-readable instructions stored thereon for execution by the processor to implement the method,
the history information comprising records each including a business process identifier, an operation identifier, an instance identifier, and information indicating a processing time of an operation of the one or more operations identified by the operation identifier,
the time series pattern generating method comprising:
generating a record in the history information every time the one or more operations are executed;
storing the generated history information in the storage system in chronological order;
extracting a set of history information records from the history information based on common instance identifiers for respective instances of the business process and generating instance history information;
creating processing order information relating to the one or more operations of the respective instances on the basis of the generated instance history information;
estimating a dependence relationship between the one or more operations on the basis of the created processing order information, expressing the dependence relationship using an adjacency matrix that represents each of the one or more operations using a respective row and a respective column and indicates each dependence between the one or more operations using a respective entry of the adjacency matrix, minimizing a number of dependencies indicated in the adjacency matrix to obtain a processing order of the one or more operations by removing indications of redundant dependencies from the adjacency matrix, and generating the time series pattern including the processing order of the one or more operations; and updating the adjacency matrix expressing the estimated dependence relationship by calculating a difference between a row representing a first component having a first processing order and a row representing a second component having a second processing order that is later than the first processing order.

\* \* \* \* \*